United States Patent [19]

Eversole

[11] Patent Number: 4,537,101
[45] Date of Patent: Aug. 27, 1985

[54] LUG NUT REMOVER

[76] Inventor: Frank A. Eversole, 327 Windley Rd., Key Largo, Fla. 33037

[21] Appl. No.: 560,240

[22] Filed: Dec. 12, 1983

[51] Int. Cl.³ .............................................. B25B 13/58
[52] U.S. Cl. .................................................. 81/180.1
[58] Field of Search ................ 81/180 R, 180 C, 462; 248/410, 354.7

[56] References Cited

U.S. PATENT DOCUMENTS

| | | | |
|---|---|---|---|
| 2,051,969 | 8/1936 | Shastock | 248/410 |
| 2,459,672 | 1/1949 | Morsch | 81/180 R |
| 2,761,340 | 9/1956 | Harrington | 81/180 R |
| 3,069,945 | 12/1962 | Shandel | 81/53 R |
| 3,832,917 | 9/1974 | Feith | 81/53 R |

Primary Examiner—James L. Jones, Jr.
Attorney, Agent, or Firm—John Cyril Malloy

[57] ABSTRACT

A support assembly for a lug wrench structure including means to removably mount a lug wrench structure and independently support the wrench in connected engagement with one lug nut such that the lever arm portion of the wrench extends outwardly a distance from the wheel so that force can be applied to the lever arm by the foot of the operator to obtain increased leverage. The lug wrench structure may be other than of conventional design and include removably secured breakdown components such that the entire support assembly and lug wrench may be stored in a compacted fashion.

12 Claims, 8 Drawing Figures

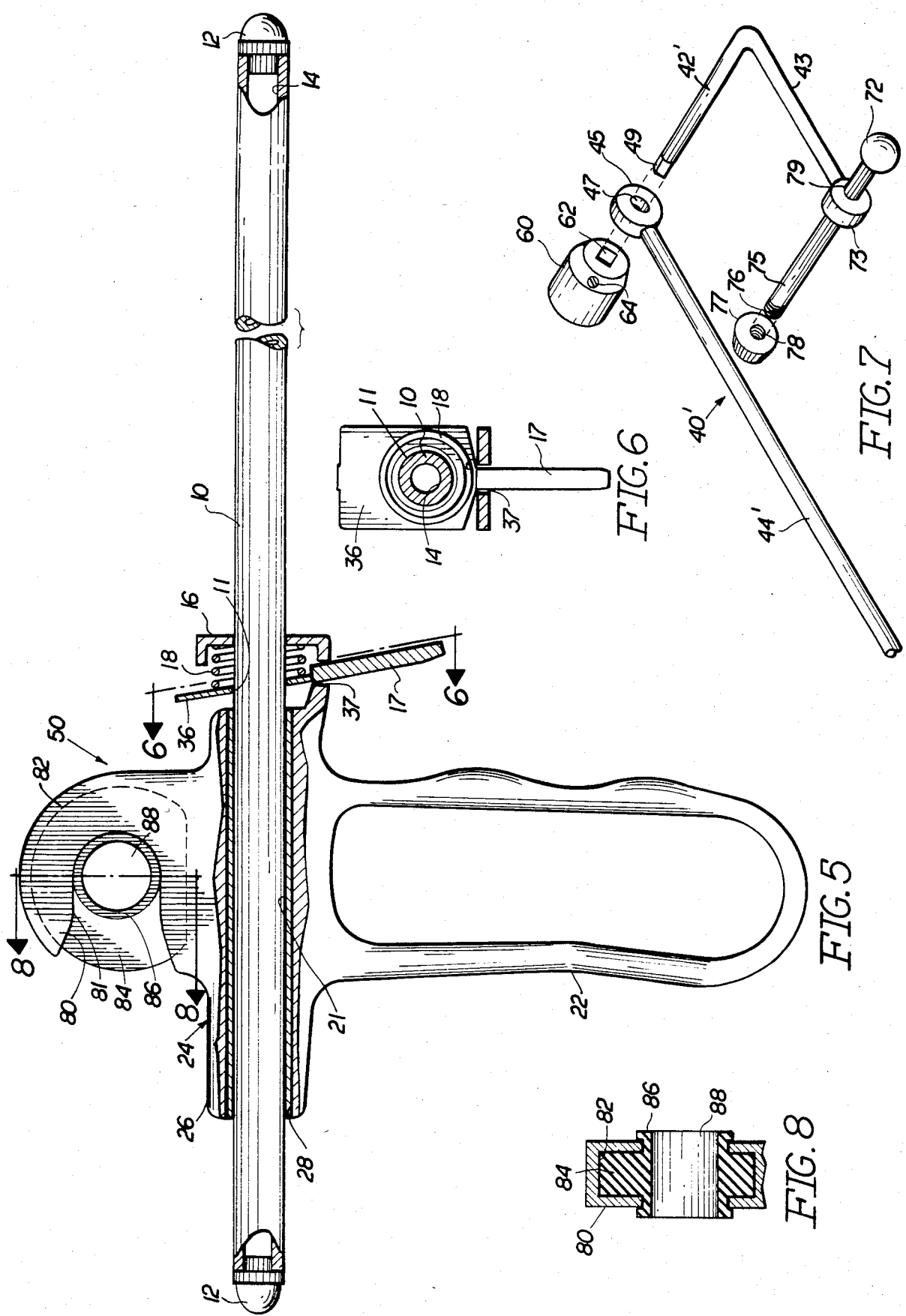

LUG NUT REMOVER

BACKGROUND OF THE INVENTION

1. Field of the Invention

A supporting assembly particularly designed to mount and support a lug wrench structure in active engagement about a lug nut but in a manner such that the lever arm portion of the lug wrench extends outwardly at an orientation relative to the wheel such that the foot may be applied to the lever arm and the lug wrench itself is held in place by the subject support assembly independently of the operator.

2. Description of the Prior Art

When changing tires on an automobile, truck or light vehicle, the nuts mounting the tire on the wheel of the vehicle are frequently difficult to remove. This is due to the fact that such nuts are oftentimes secured to the wheel by a power driven device. While removing the lug nuts with a similar power driven tool is relatively easy, such tools of course are not normally available in the field when changing a flat tire. As a result, the person changing the tire has to utilize a lug wrench, which may be of conventional design, and apply arm and hand force to the lever arm of the wrench to remove the lug nuts.

The operator is somewhat restricted in that the lug wrench must be maintained in place about the lug nut by one hand and force must be applied to the lever arm with the other hand and arm. Therefore, the operator is restricted from putting the full force or weight of his body onto the lever arm of the lug wrench since it is of course imperative that the head or socket portion of the wrench must be maintained in surrounding engagement about the lug nut being removed or tightened.

Even when such lug nuts are not applied by power driven tools, a person such as a woman, teenagers, etc. frequently do not have the strength to remove the lug nut when applying only one hand and arm to the lever arm of the wrench as set forth above.

Prior art devices representative of existing and commercially available equipment are disclosed in the following United States Patents: U.S. Pat. No. 2,459,672; U.S. Pat. No. 4,300,412; U.S. Pat. No. 3,262,341; and U.S. Pat. No. 2,614,444.

These problems could be overcome to a large extent if a lug wrench structure, either specifically or conventionally designed, could be maintained in place about or in engagement with the lug nut independent of the operator holding it in such place. This would free the arms and/or hands and feet of the operator so that he could effectively stand on the lever arm of the lug wrench with at least one foot thereby applying almost the full force of his weight to the lever arm. In order to accomplish this free and substantially independent positioning of the lug wrench in operative engagement with a lug nut, some type of support assembly is needed to properly orient the lug wrench without requiring holding it in place by the operator thereof. This would of course overcome the above set forth problems and allow a greater portion of the weight and force of the body to be applied to a distal end of the lever arm of the lug wrench to either remove or replacce a lug nut.

SUMMARY OF THE INVENTION

The present invention is directed towards a support assembly specifically intended to maintain a lug wrench means in operative engagement about a lug nut secured to the wheel of a vehicle independent of the operator holding or physically maintaining the lug wrench in such position. This would enable the operator to effectively stand back from the tire or wheel and force the lever arm of the lug wrench downwardly by stepping on the distal end thereof. This in turn would allow greater force to be applied to the lug wrench for removing the nut. In order to accomplish this, the subject support assembly comprises a body including a mounting means secured thereto. The mounting means is specifically structured to removably secure and at least partially support a lug wrench means on the body. More specifically, the lug wrench is secured such that the head or socket portion of the wrench is maintained about the nut to be removed and the lever arm extends outwardly from the body away from the wheel.

The body further includes a support means preferably in the form of an elongated barrel having an interior channel extending along the length thereof. A support rod is slidably mounted within the channel and is selectively positionable therein along its length. A locking means is further secured to the body means in at least partiallly engaging relation to an exterior portion of the support rod.

A biasing means is incorporated within the locking means so as to position the locking means, or portions thereof, into frictional engagement with the support rod thereby eliminating relative movement between the support rod and the body and serving to secure the support rod in a predetermined and preselected position. One distal end or tip of the support rod is specifically structured and may be disposed into engaging relation with an interior rim of the wheel being mounted or removed from a vehicle.

In operation, the support rod is positioned to extend away from the body means and is maintained in a preselected position and in engagement with the interior rim of the tire. The locking means is manipulated, by hand, to secure the support rod in this intended fashion. A lug wrench is then secured to the body means by passing through the mounting means which may be in the form of a mounting ring of sufficient internal diameter so as to at least partially surround the operating arm of the lug wrench. A rubber grommet or like structure is inserted so as to snugly grasp the exterior of the lug wrench and serves to secure the wrench in proper orientation. Relative positioning of the mounting means and support means as well as the support rod is such as to orient the operating arm of the lug wrench in substantially transverse relation to the longitudinal axis of the support rod. Accordingly, the lever arm of the lug wrench extends away from the body of the support assembly and outwardly from the entire wheel assembly. This allows the operator to effectively stand back or be removed from the placement of the lug wrench on the nut being removed. Therefore the operator can at least partially stand or at least use foot force on the distal end of the lever arm of the lug wrench to remove the lug. This increased pressure, due to a significant portion of the weight of the body being applied to the lever arm will serve to remove almost any lug nut even when such nut is applied through power driven tools as set fort above.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings, in which:

FIG. 5 is a front elevational view in partial section showing structural detail of the components of the support assembly of the present invention.

FIG. 6 is a sectional view taken along line 6—6 of FIG. 5.

FIG. 7 is an exploded view of various components of an alternate structure of a lug wrench which is operable with the support assembly of the present invention.

FIG. 8 is a sectional view taken along line 8—8 of FIG. 5 showing details of the grommet structure of a mounting ring therein.

Like reference characters refer to like parts throughout the several views of the drawings.

DETAILED DESCRIPTION OF THE PREFERRED EMBODIMENT

Figure 1:
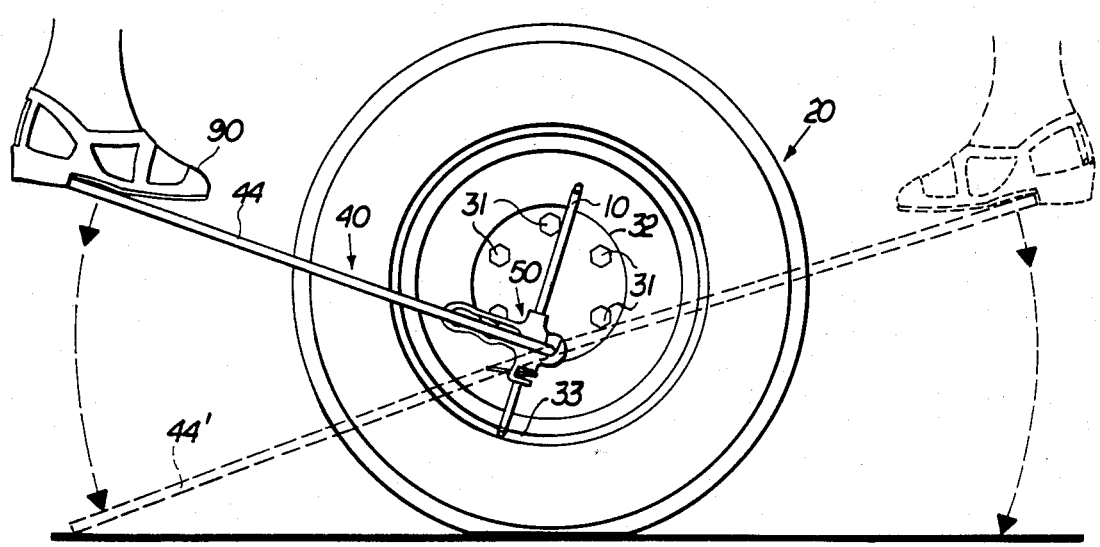
FIG. 1 is a front elevation showing the support assembly and a lug wrench structure secured in operative relation about a lug nut on a wheel of a vehicle.
Figure 3:
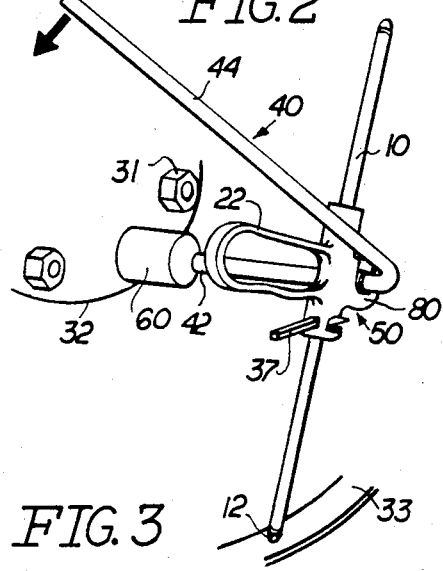
FIG. 3 is an isometric view of one embodiment of the support assembly utilizing a conventional lug wrench.

First with reference to FIGS. 1, 3 and 5, the present invention is directed towards a support assembly generally indicated as 50 which is specifically designed to support or maintain a lug wrench generally indicated as 40 in operative engagement with a lug nut 31 mounted on the wheel portion 32 of a vehicle tire, generally indiated as 20. With regard to the embodiments of FIGS. 1 and 3, the lug wrench means 40 includes an operative arm portion 42 having its distal end connected to a nut socket 60 which at least partially surrounds the conventional lug nuts 31 and serves to remove them or secure the nuts 31 to the wheel base 32 in a conventional fashion. The lug wrench means 40 as shown in FIGS. 1 and 3 may be of substantially conventional design and includes a lever arm 44 arranged substantially at right angles to the operating arm 42 and having a length sufficient to extend outwardly therefrom such that force may be applied to the distal end thereof and accomplish sufficient leverage to remove the nuts 31.

Figure 4:
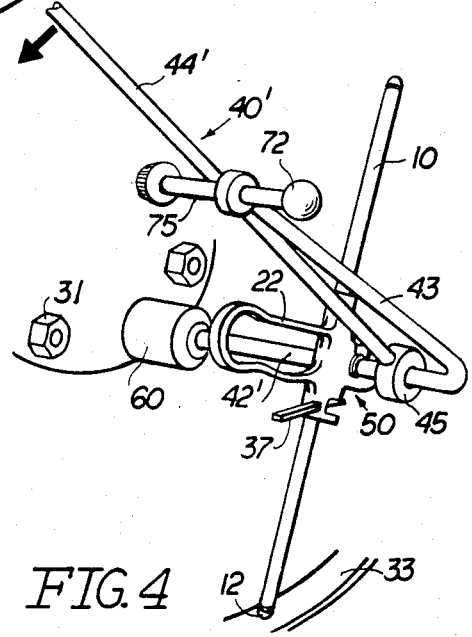
FIG. 4 is an isometric view of another embodiment of the support assembly incorporating a modified lug wrench structure.

With regard to FIGS. 4 and 7, the present invention includes the subject support assembly in use in combination with a lug wrench means generally indicated as 40′ which is defined by a plurality of removable components capable of being "broken down" and thereby stored in a small area. More specifically, the lug wrench means 40′ includes an operative arm 42′ connected to an arm extension 43. A lever arm portion 44′ has an elongated configuration of greater length than the operative arm 42′ but differs in that the operative arm 42′ passes through head portion 45 and more specifically aperture 47 integrally formed therein. By virtue of this connection, the lever arm 44′ is rotatable substantially about the longitudinal axis of the operative arm 42 and the arm extension 43 is disposed in substantially parallel relation to the plane of movement or of rotation of the lever arm 44′. The head 49 of operative arm 42′ fits within the socket 60 in the conventional fashion wherein the socket 60 is specifically dimensioned and/or structured to fit about a lug nut 31 in a manner which is well known in the art. Again with regard to FIG. 7, the lug wrench means 40′ further comprises a bearing arm 75 serving to pass through head 72 and more particularly aperture 74 to which it is connected by connector element 77. As set forth in FIG. 7, the distal end 76 may be externally threaded to slidably pass through the aperture 74 and be threadably secured to an internally threaded connector 77. Alternately, and as not shown, the interior of the aperture 74 may be substantially smooth so as to allow sliding engagement of the bearing arm 75 within the aperture 74 and placement thereof in any of a number of locations being substantially parallel to the operative arm 42′.

Actual operation and interaction between the lug wrench means 40′ and the support assembly 50 will be explained in greater detail hereinafter specifically with regards to FIG. 4.

With reference to FIGS. 1, 3 and 5, the subject support assembly includes a body means 21 having a handle portion 22 integrally formed thereon. A support rod 10 is movably mounted and supported by the body 21 through the provision of an attachment means generally indicated as 24. More specifically, the attachment means includes a barrel 26 having an elongated interior channel 28 extending along the length thereof. The channel 28 is sufficiently dimensioned to substantially surround the support rod 10 but allows sliding movement of the support rod 10 along its length. Opposite ends or tips may be in the form of protective caps 12 wherein one end of rod 10 and cap 12 secured thereto is intended to engage (see FIGS. 1 and 2) an interior rim portion 33 of a conventional wheel structure which supports tire 20. Each of the caps 12 may have a generally conical or similar configuration but the caps 12 should not be specifically limited to such a conical configuration. Proper placement of tip 12 is accomplished by positioning the support rod 10 relative to the barrel 26 and more specifically the channel 28 to a point where the tip firmly engages the rim 33 once the lug wrench is secured to the body 50. Proper positioning and maintenance of support rod 10 in the desired position relative to the interior rim 33 is accomplished through the provision of a locking means generally indicated as 35 (see FIGS. 5 and 6). The locking means includes a grommet portion 36 integrally or otherwise connected to an operating lever 37 wherein the grommet 36 is subjected to a biasing force by a biasing means in the form of a spring 18. A retaining collar 16 may be integrally secured to the body means 21 and be structured to at least partially surround the biasing spring 18 so as to eliminate possibility of displacement from its intended position. In its intended position, the biasing spring 18 forces the grommet 36 into frictional engagement with the exterior surface of support rod 10. An integrally formed aperture 11 is formed in the grommet 36 and when the grommet is disposed in a skewed positioned as shown in FIGS. 5 and 6, frictional engagement occurs between the perimeter of aperture 11 and the external surface of the support rod 10. An operating lever 17 is in the form of a trigger and is disposed to extend through aperture 37 in convenient location relative to the handle portion 22. Depression of this operating lever or trigger 17 serves to move the grommet 36 against the biasing force of spring 18 and serves to remove the grommet 36 from any retaining engagement with the exterior surface of the support rod 10. Therefore, the support rod 10 can be freely positioned relative to the barrel 26 and the body 21 when the trigger 17 is depressed. However, the rod 10 is maintained in the intended position wherein cap 12 engages interior rim 33 when the biasing force of spring 18 is allowed to force the grommet 36 into frictional engagement with the rod 10.

An important feature of the present invention comprises the provision of a mounting means generally indicated as 80 and includes an open, substantially hollow interior configuration having a peripheral curvilinear edge 81. As shown in FIGS. 5 and 8, a mounting assembly ring 84 is formed from flexible substantially rubber or like material and includes a central aperture 88 with a surrounding peripheral ring 86 conforming to the outline of the periphery 81. The dimension of the central aperture 88 is such as to snugly fit and generally conform to the outer surface of the lug wrench so as to at least partially engage the lug wrench in a tight fit and help maintain orient the lug wrench in the desired position. Further, the mounting ring 84 and more particularly the central axis of the aperture 88 is disposed substantially transverse to the longitudinal axis of the support rod 10 and/or the channel 28 of barrel 24. It is important to note tht while the aperture 88 is sufficient to snugly fit against the outer surface of a lug wrench, it does allow sliding positioning and securing engagement of the operative arm 42 or 42' of a lug wrench means 40 or 40'.

Figure 2:
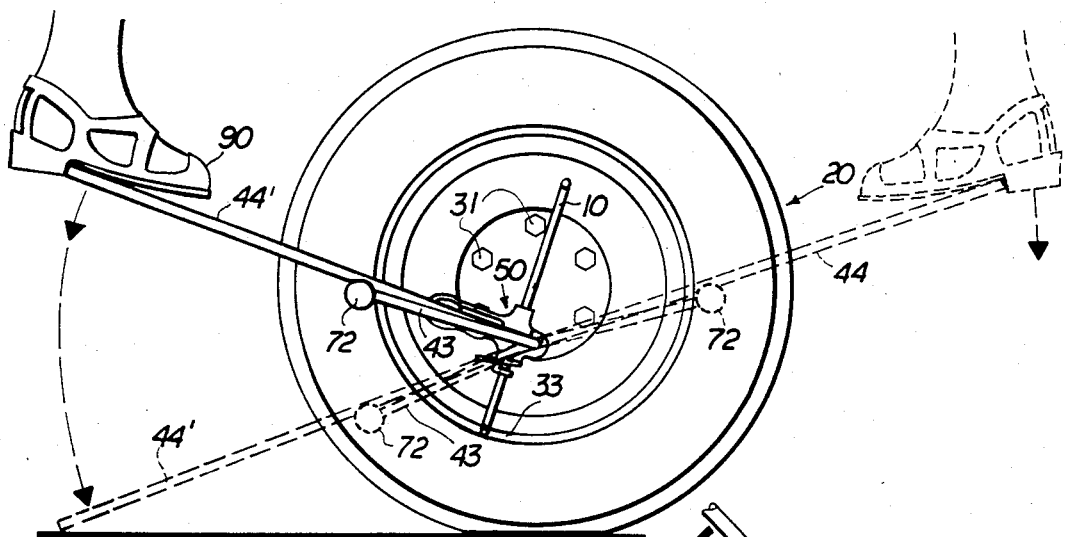
FIG. 2 is a front elevation of another embodiment of the support assembly in the same operative position as regards to FIG. 1.

As best shown in FIGS. 3 and 4, once the operative arm 42 is placed through the mounting ring 84, it is secured about a lug nut 31. In this orientation, the supporting arm serves to freely and independently support the lug wrench in its intended position in engagement with a lug nut 31 independent of any operator holding the lug wrench in place. Therefore, as best shown in FIGS. 1 and 2, the operator may effectively stand away from the tire or wheel and allow a significant portion of his body weight to be applied to the distal end of lever arm 44 or 44'. Such body weight may be applied by effectively standing or forcing the lever arm 44 or 44' downwardly utilizing the foot as shown.

With regard to FIG. 3, the lug wrench means 40 operates in a conventional fashion wherein the operating arm 42 is arranged angularly and/or preferably substantially perpendicular to the lever arm 40. With regard to FIG. 4 the operating arm 42' passes through the head 45 of the lever arm 44' such that the lever arm 44' is rotatable about the axis thereof. Once the socket or head 60 is in place about a lug nut 31 and further, once the support rod 10 has its distal tip 12 engaging the interior rim 33, the lever arm 44' may be placed above and in resting, supporting relation on the bearing arm 75 extending outwardly from the arm extension 43 of the operating arm 42'.

As shown in FIG. 2, forcing of the lever arm 44' downwardly by a foot or other portion of the human body serves to rotate the operative arm 42' and the attached socket 60 and accordingly any lug nut secured to the socket 60. This rotation occurs by force being applied to the bearing arm 75 through the arm extension 43 integrally secured to the operative arm 42'.

It is therefore to be understood that the following claims are intended to cover all of the generic and specific features of the present invention herein described, and all statements of the scope of the invention which, as a matter of language, might be said to fall therebetween.

Now that the invention has been described, What is claimed is:

1. A support assembly primarily designed for use in combination with a lug wrench means for removal of lug nuts from a wheel, said assembly comprising:
   (a) body means comprising attachment means formed thereon and a mounting means integrally secured to said body means and structured to removably mount a lug wrench means thereon,
   (b) a support rod movably secured to said body means and interconnected to said attachment means, and selectively positioned into engaging relation with a wheel on which said lug wrench means is mounted,
   (c) locking means secured to said body means in fixed relation thereto and positionable into and out of frictional, substantially locking engagement with said support rod,
   (d) said mounting means disposed to substantially orient and maintain the lug wrench means in substantially transverse relation to said support arm when the former is engaging a lug nut and the latter is engaging the wheel on which the lug nut is secured, and
   (e) said lug wrench means comprising a lever arm portion extending outwardly from said body means when said lug wrench is supported on said mounting means; said lug wrench means further comprising an operative arm portion having one end connected to said lever arm portion and an opposite free end secured to a socket means; said lever arm portion disposed in substantially transverse relation to said operating arm portion,
   (f) said lever arm portion being rotatably connected to said operating arm portion, said operating arm portion including an arm extension disposed in substantially perpendicular relation to said operating arm portion, a bearing arm mounted on a free end of said arm extension in perpendicular relation to said arm extension and disposable in interruptive relation to a path of travel of the movement of said lever arm portion relative to said operating arm portion;
   (g) whereby a lever arm of the lug wrench is extended and maintained outwardly from the wheel for forceful engagement by the foot of one removing the lug nut.

2. A support assembly as in claim 1 wherein said locking means comprises a grommet means disposed in surrounding relation to said support rod, biasing means engaging said grommet means and normally disposing said grommet means into frictional engagement with an outer surface of said support rod, whereby said support rod is fixedly positionable relative to said housing and in engagement with the wheel.

3. A support assembly as in claim 2 wherein said locking means includes an operating lever interconnected to said grommet means and disposed in biased relation to said biasing means and structured to position said grommet means out of engagement with said support rod against biasing force of said biasing means, whereby said support rod is movable along its length relative to said body means.

4. A support assembly as in claim 1 wherein said mounting means comprises a mounting ring means structured for at least partially surrounding engagement with said lug wrench means, said mounting ring defining a central aperture therein being dimensioned to allow a lug wrench portion to pass therethrough, said central aperture including a central axis disposed in substantially transverse relation to the length of said support rod.

5. A support assembly as in claim 1 wherein said lug wrench means comprises an integral, one-piece structure including said lever arm portion and said operating arm portion integrally secured together and relatively oriented in substantially perpendicular relation to one another.

6. A supporting assembly as in claim 1 wherein said socket means is removably secured to a free distal end of said operating arm portion.

7. A support assembly primarily designed for use in combination with a lug wrench for removal of lug nuts from a wheel, said assembly comprising:
  (a) a body including a mounting means formed thereon and structured for removably mounting a lug wrench on said body,
  (b) a support rod having an elongated configuration and movably secured to said body and having a sufficient longitudinal dimension so as to selectively position either of two oppositely disposed ends of said support rod into engaging relation with a wheel to which said lug wrench is connected,
  (c) locking means secured to said body and positionable at least in part into and out of frictionally, substantially locking engagement with said support rod,
  (d) attachment means secured to said body and removably interconnecting said support rod to said body and including a channel having an elongated, linear configuration and disposed and structured for surrounding relation to a length of said support rod,
  (e) said support rod slidably movable within said channel along its length and in a direction coaxial to the length of aid channel and between said opposite ends of said support rod,
  (f) said mounting means disposed to orient and maintain said lug wrench in substantially transverse relation to said support rod when said lug wrench is engaging a lug nut and said support rod is engaging the wheel on which the lug nut is secured, and
  (g) the lug wrench means including a lever arm portion extending outwardly from said body and maintained outwardly from the wheel for forceful engagement by a foot of one removing the lug nut.

8. A support assembly as in claim 7 wherein said locking means is positioned adjacent one end of said channel in substantially surrounding relation to said support rod.

9. A support assembly as in claim 7 wherein said body means further comprises a handle structure secured thereto and configured to facilitate gripping of said support assembly by a hand of the user, said handle structure connected in depending, outwardly extending relation from one side of said channel.

10. A support assembly as in claim 9 wherein said mounting means extends outwardly from an opposite side of said channel relative to said handle structure and is configured for substantially surrounding relation to the lug wrench when the latter is passed therethrough.

11. A support assembly as in claim 10 wherein said mounting means comprises a mounting ring structured for at least partially surrounding engagement with said lug wrench means, said mounting ring defining a central aperture therein being dimensioned to allow a lug wrench means to pass therethrough, said central aperture including a central axis disposed in substantially transverse relation to the length of said support rod.

12. A support assembly as in claim 11 wherein said channel, said handle structure and said mounting means are each structured and configured for collective disposition in substantially coplanar relation to one another.

* * * * *